United States Patent
Dosani et al.

[11] Patent Number: 5,934,369
[45] Date of Patent: Aug. 10, 1999

[54] THERMAL STORAGE CONTROLLER

[76] Inventors: Nazir Dosani, 8 Harris Way, Thornhill, Ontario, Canada, L3T-5A7; Nizar Ladha, 192 Harrision Dr., Newmarket, Ontario, Canada, L3Y-4B6

[21] Appl. No.: 08/810,861

[22] Filed: Mar. 4, 1997

[51] Int. Cl.⁶ .................. F24D 11/00; F28D 20/00
[52] U.S. Cl. ................ 165/236; 392/345; 392/360
[58] Field of Search .................. 165/236; 126/400; 392/345, 360; 236/46 R

[56] References Cited

U.S. PATENT DOCUMENTS

| | | | |
|---|---|---|---|
| 3,975,620 | 8/1976 | Hallgreen et al. | 165/236 X |
| 4,061,185 | 12/1977 | Faiczak | 165/236 X |
| 4,117,307 | 9/1978 | Iversen et al. | 392/345 X |
| 4,916,904 | 4/1990 | Mathur et al. | 165/236 X |
| 5,178,206 | 1/1993 | Saunders | 392/345 X |
| 5,203,497 | 4/1993 | Ratz et al. | 236/46 R |

*Primary Examiner*—William Wayner

[57] ABSTRACT

A thermal storage controller apparatus and methodology to establish the heat-loss of a dwelling and thereby charge the thermal storage system accordingly, and maintaining a history of the environment to adjust the thermal storage capacity. The system includes the apparatus to control slave thermal storage systems based on the readings from the main thermal storage system.

23 Claims, 2 Drawing Sheets

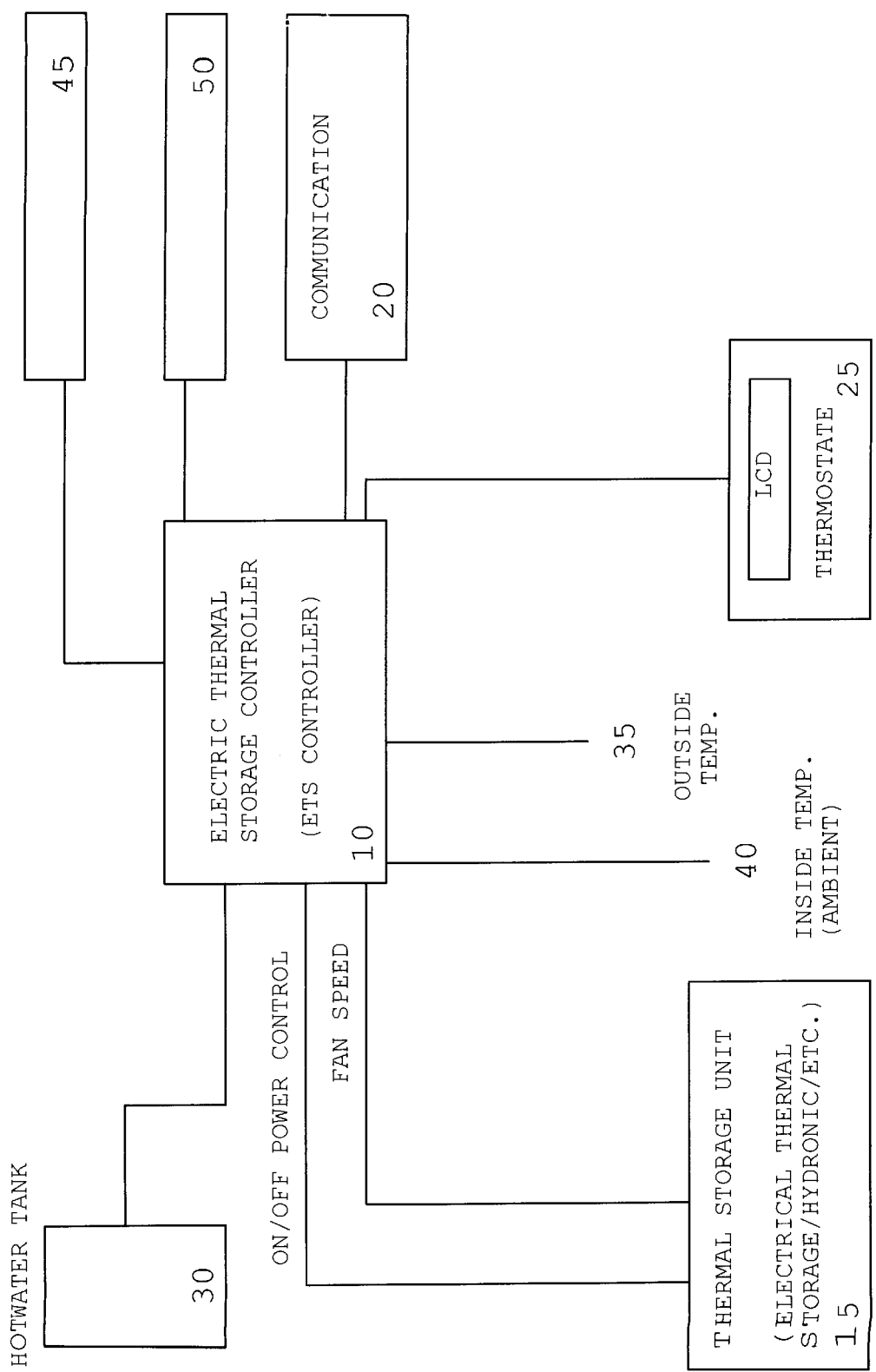
FIGURE 1/2

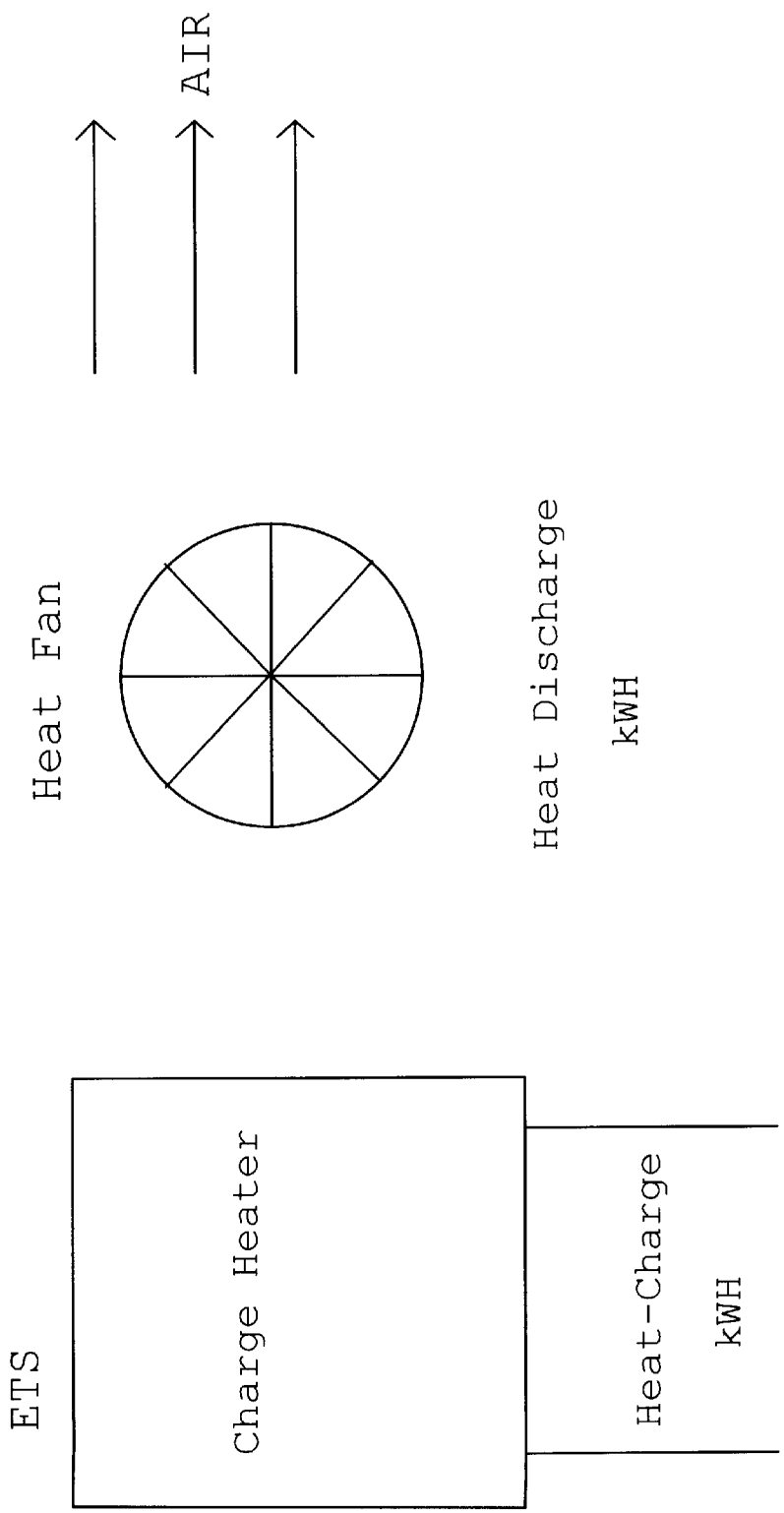
FIGURE 2/2

THERMAL STORAGE CONTROLLER

FIELD OF INVENTION

This invention relates to the control of a thermal storage system for a dwelling. More particularly, the invention relates to a method of charging a thermal storage system to ensure the thermal storage system has enough heat to compensate for the heat loss of a dwelling and to a thermal storage system.

BACKGROUND OF THE INVENTION

There are a number of variables which must be considered when calculating the heat loss of a dwelling. These variables include:

1. The location of the dwelling.
2. Air change heat loss.
3. Duct heat loss for air system.
4. Wind factor.
5. Lifestyle of people occupying the dwelling.
6. Upgrades to the dwelling.

A person, calculating the heat loss of a dwelling, also has to account for the material used within the dwelling and surface area of the walls and windows exposed to the outside elements and then use the following formula to compute the heat loss in Btuh (British Thermal Units per hour) or kWh (KiloWatts per Hour) units.

Heat Loss can be expressed as:

$$\text{Heat Loss} = [\text{Area} \cdot \text{Temp}]/R$$

Where:

Area is equal to the surface area of the material used;

Temp is equal to the difference between the temperature inside and outside the dwelling; and "R" is the Thermal Resistance of the material used in the dwelling.

"R" is expressed in English units, i.e. feet, degrees Fahrenheit, hour.

"RSI" is expressed in SI or metric units, i.e. meters, degrees Celsius.

A R12 rating would have an equivalent RSI rating of 2.11.

To convert "R" values to "RSI" values, divide the "R" value by 5.678

Since the above Heat Loss formula has to be applied to every material used within the dwelling and is dependent on the construction of the dwelling, the heat loss calculation can be complex and time consuming.

Thermal storage systems are typically installed in dwellings to provide heat by conduction, convection and/or radiation. A large thermal storage system will often over heat the dwelling while too small a thermal storage system will not be able to compensate for the heat loss of the dwelling resulting in insufficient heating.

Currently, timers are used to control thermal storage systems. Timers simply turn the thermal storage systems on or off, regardless of weather patterns. This often results in the thermal storage systems either being over charged or under charged. Very rarely do the thermal storage systems conform to the dwelling's thermal specifications.

Furthermore the timers do not allow for changes in the lifestyle of the dwelling occupants.

Patents, such as U.S. Pat. No. 5,178,206 issued to Saunders and U.S. Pat. No. 5,197,666 issued to Wedekind, disclose the control of thermal storage systems by predicting the temperature of the outside environment.

Temperature predictions rarely come true and therefore, these thermal storage systems do not live up to expectations.

Furthermore similar dwellings could have different "R" values due to:

1. Upgrades to the dwelling.
2. Lifestyle of people occupying the dwelling.
3. Location of dwelling.

Therefore, thermal storage systems may not perform up to expectations.

The 'heat-request' signal from the thermostat takes into account the following and therefore is a better indicator for charging a thermal storage unit:

1. Upgrades to thermal insulation within the dwelling.
2. Lifestyle of people occupying the dwelling.
3. Location of the dwelling.
4. Status of outside air temperature.
5. Humidity within the dwelling.

As human comfort for heating includes the humidity factor also, using the air temperature alone does not give a true picture.

It is therefore an object of the present invention to provide a novel method of charging a thermal storage system and a novel thermal storage system.

SUMMARY OF THE INVENTION

According to one aspect of the present invention there is provided a method of charging a thermal storage system, comprising the steps of:

setting a desired set temperature point of a conditioned space;

measuring over a period of time, the time the temperature of said conditioned space is below said set temperature point;

calculating the thermal charge of a thermal storage unit using said measurement; and charging said thermal storage unit in accordance with said calculated thermal charge.

According to another aspect of the present invention there is provided a thermal storage system comprising:

a thermal storage unit to heat a conditioned space;

a thermostat to allow a desired set point temperature of said conditioned space to be set;

a controller in communication with said thermostat and said thermal storage unit, said controller measuring over a period of time when the temperature of said conditioned space is below said set point temperature as determined by said thermostat and calculating the thermal charge of said thermal storage unit using said measurement, said controller charging said thermal storage unit in accordance with said calculated thermal charge.

Preferably, the thermal storage system stores enough heat to compensate for heat loss of the dwelling without over heating the dwelling.

It is also prefered that the thermal storage system maintains a history of the environment to adjust the amount of heat stored in the thermal storage system.

It is further preferred that the thermal storage system maintains a minimum thermal heat to combat sudden drops in outside temperatures.

The thermal storage system in accordance with the present invention reduces costs by controlling slave thermal storage systems based on the readings and history of the main thermal storage system within the dwelling.

BRIEF DESCRIPTION OF THE DRAWINGS

A preferred embodiment of the present invention will now be described by way of example only with reference to the accompanying drawings in which:

FIG. 1 is a block diagram of one embodiment of a thermal storage system in accordance with the present invention; and FIG. 2 is a block diagram of a thermal storage unit forming part of the thermal storage system of FIG. 1.

DETAILED DESCRIPTION OF THE PREFERRED EMBODIMENT

As shown in FIG. 1, in one embodiment of the present invention a thermal storage system is provided and comprises a thermal storage controller, shown generally as 10, for controlling a thermal storage unit 15, a hot water tank 30 and also slave thermal storage systems 45 and 50 respectively. For the purpose of this example the number of slave thermal storage systems has been restricted to 2 but those of skill in the art will appreciate that a larger number of slave systems can be connected to the controller 10.

A thermostat 25 is connected to the controller 10 to allow the temperature of the dwelling to be controlled. The thermostat can be analog or digital as controller 10 can support both formats.

The 'heat-request' signal from the thermostat 25, over time, is used as an indicator for the heat loss of the dwelling.

Temperature sensors 35 for out-door temperature and sensor 40 for in-door temperature are also connected to the controller 10.

A two-way communication port 20 allows controller variable data to be downloaded to the controller for storage in its memory. The controller variables include the maximum dwelling temperature, the thermal storage system's on/off time, the power available to heating elements, and the number of elements to use. The stored data can be active for a period of time (minutes, hours or any other time unit), and different stored data can be active for each time period. The length of each time period can also be programmed.

The two-way communication port 20 further provides means for communication to re-program, locally or remotely, the data stored within the memory in controller 10.

The invention makes use of a Thermal Counting system to charge the thermal storage unit. The Thermal Counting system is explained below.

Controller 10 controls the electrical power used by heating elements within the thermal storage system. Specifics of the controller operation can be found in co-pending application Ser. No. 08/302,911 filed on Jul. 12, 1993 for an invention entitled "Power Controller Device", the content of which is incorporated herein by reference.

FIG. 2 better illustrates the thermal storage unit 15 and as can be seen, it includes a charge heater and a fan. The fan is responsive to the controller 10 and adjusts its speed accordingly. The heat required to charge the thermal storage unit at 100% power and also to discharge it are normally specified as a thermal storage unit rating by the manufacture in kWh. These values are used by the controller 10 to adjust the charge within the thermal storage unit 15.

When the temperature in the dwelling drops below the temperature set point of the thermostat, the thermostat 25 generates a heat request signal. In the present embodiment, the controller 10 measures heat request signals generated by the thermostat over time. The total time that the temperature of the conditioned space is below the set point of thermostat 25 is therefore monitored and is stored as a variable "$Time_{fan}$".

Discharging of the thermal storage unit can be expressed as follows:

$$Time_{fan} * Discharge_{factor} = Energy_{required}$$

Where:

$Time_{fan}$ is the time that the discharge fan is on, over a 24 hour period;

$Discharge_{factor}$ is in units of kWh, and is a rating of the thermal storage unit supplied by the manufacturer;

$Energy_{required}$ is the total energy discharged from the thermal storage unit.

Charging of the thermal storage unit can be expressed as:

$$Time_{charge} = Energy_{required} / Charge_{factor}$$

Where:

$Time_{charge}$ is the time required to re-charge the thermal storage unit;

$Energy_{required}$ is calculated from the 'discharge' formula;

$Charge_{factor}$ is in units of kWh, and is a rating of the thermal storage unit supplied by the manufacturer.

If required the $Discharge_{factor}$ and $Charge_{factor}$ can be adjusted to compensate for a poor thermal insulation within the dwelling.

In a further preferred embodiment, the controller 10 monitors the efficiency of the electric heating elements.

For the electric heating element efficiency, a timer is used to measure the temperature change of the thermal storage media being heated with a given amount of power to the heating elements. If it takes too long to change the temperature of the thermal storage media then the efficiency of the heating elements has dropped. The measured time can be compared to stored values. With a drop in the efficiency of the heating elements, an operator can be warned and the information can be saved in memory with a time stamp.

In a further preferred embodiment, controller 10 controls the speed of fan moving hot air within the dwelling. By setting the speed of the fan to the lowest setting to compensate for heat loss, the comfort of the occupant is increased as this reduces the on/off cycling of the heating fan. Also slower moving air creates less draft within the dwelling and heats the surrounding objects more evenly which in turn increases the comfort of the occupants. The slow fan speed also reduces the power requirements for the motor of the fan.

Although preferred embodiments of the present invention have been described, those of skill in the art will appreciate that variations and modifications may be made without departing from the spirit and scope thereof as defined by the appended claims.

We claim:

1. A method of charging a thermal storage system, comprising the steps of:

setting a desired set temperature point of a conditioned space;

measuring over a period of time, the time the temperature of said conditioned space is below said set temperature point;

calculating the thermal charge of a thermal storage unit using said measurement; and charging said thermal storage unit in accordance with said calculated thermal charge wherein said thermal charge is calculated according to a charge formula of the form:

$$Time_{charge} = Energy_{required} / Charge_{factor}$$

Where:

$Time_{charge}$ is the time required to re-charge said thermal storage unit;

$Energy_{required}$ is a function of said measurement and is calculated using a discharge formula; and Charge$_{factor}$ is in units of kWh, and is a rating of said thermal storage unit.

2. The method of claim 1 wherein said discharge formula is of the form:

$$\text{Energy}_{required} = \text{Time}_{fan} * \text{Discharge}_{factor}$$

Where:

Time$_{fan}$ is the time the temperature of said conditioned space is below said set temperature point over a 24 hour period;

Discharge$_{factor}$ is in units of kWh, and is a rating of said thermal storage unit; and Energy$_{required}$ is the total energy discharged by the thermal storage unit.

3. The method of claim 1 wherein said period of time is adjustable.

4. The method of claim 3 wherein said period of time is remotely programmable.

5. The method of claim 3 further comprising the step of monitoring the efficiency of heating elements of said thermal storage unit.

6. The method of claim 5 wherein during said monitoring step, the temperature change of a thermal storage media of said thermal storage unit is measured after being heated by said heating elements while said heating elements are supplied with a given amount of power for a fixed amount of time.

7. The method of claim 6 further comprising the step of storing information concerning heating element efficiency.

8. The method of claim 3 further comprising the step of controlling the fan speed of said thermal storage unit to reduce on/off cycling thereof.

9. The method of claim 8 wherein during said controlling step, the fan speed is set to a low fan speed setting.

10. A thermal storage system comprising:

a thermal storage unit to heat a conditioned space;

a thermostat to allow a desired set point temperature of said conditioned space to be set;

a controller in communication with said thermostat and said thermal storage unit, said controller measuring over a period of time when the temperature of said conditioned space is below said set point temperature as determined by said thermostat and calculating the thermal charge of said thermal storage unit using said measurement, said controller charging said thermal storage unit in accordance with said calculated thermal charge wherein said thermal charge is calculated according to a charge formula of the form of:

$$\text{Time}_{charge} = \text{Energy}_{required} / \text{Charge}_{factor}$$

Where:

Time$_{charge}$ is the time required to re-charge said thermal storage unit;

Energy$_{required}$ is a function of said measurement and is calculated using a discharge formula; and Charge$_{factor}$ is in units of kWh, and is a rating of said thermal storage unit.

11. A thermal storage system as defined in claim 10 wherein said discharge formula is of the form:

$$\text{Energy}_{required} = \text{Time}_{fan} * \text{Discharge}_{factor}$$

Where:

Time$_{fan}$ is the time the temperature of said conditioned space is below said set temperature point over a 24 hour period;

Discharge$_{factor}$ is in units of kWh, and is a rating of said thermal storage unit; and Energy$_{required}$ is the total energy discharged by said thermal storage unit.

12. A thermal storage system as defined in claim 11 wherein said period of time is adjustable.

13. A thermal storage unit as defined in claim 12 wherein said controller is remotely programmable.

14. A storage system as defined in claim 12 wherein said controller monitors the efficiency of heating elements of said thermal storage unit.

15. A thermal storage system as defined in claim 14 wherein said controller measures the temperature change of a thermal storage media of said thermal storage unit after said thermal storage media is heated by said heating elements while said heating elements are supplied with a given amount of power for a fixed amount of time thereby to determine the efficiency of said heating elements.

16. A thermal storage system as defined in claim 15 wherein said controller stores information concerning heating element efficiency.

17. A thermal storage system as defined in claim 12 wherein said controller controls the fan speed of said thermal storage unit to reduce on/off cycling thereof.

18. A thermal storage system as defined in claim 17 wherein said controller maintains the fan speed at a low fan speed setting.

19. A method of charging a thermal storage system comprising the steps of:

setting a desired set temperature point of a conditioned space;

measuring over a period of time, the time the temperature of said conditioned space is below said set temperature point, said period of time being adjustable;

calculating the thermal charge of a thermal storage unit using said measurement; and charging said thermal storage unit in accordance with said calculated thermal charge; and controlling the fan speed of said thermal storage unit to reduce on/off cycling thereof.

20. The method of claim 19 wherein during said controlling step, the fan speed is set to a low fan speed setting.

21. A method of charging a thermal storage system comprising the steps of:

setting a desired set temperature point of a conditioned space;

measuring over a period of time, the time the temperature of said conditioned space is below said set temperature point, said period of time being adjustable;

calculating the thermal charge of a thermal storage unit using said measurement; and charging said thermal storage unit in accordance with said calculated thermal charge; and monitoring the efficiency of heating elements of said thermal storage unit.

22. The method of claim 21 wherein during said monitoring step, the temperature change of a thermal storage media of said thermal storage unit is measured after being heated by said heating elements while said heating elements are supplied with a given amount of power for a fixed amount of time.

23. The method of claim 22 further comprising the step of storing information concerning heating element efficiency.

* * * * *